United States Patent
Gordon et al.

(10) Patent No.: US 7,634,976 B2
(45) Date of Patent: Dec. 22, 2009

(54) APPARATUS AND METHOD FOR DELIVERING WATER INTO A WATER HEATER

(75) Inventors: Michael Gordon, East Grand Rapids, MI (US); Wade Bernreuter, Lowell, MI (US)

(73) Assignee: Bradford White Corporation, Ambler, PA (US)

( * ) Notice: Subject to any disclaimer, the term of this patent is extended or adjusted under 35 U.S.C. 154(b) by 235 days.

(21) Appl. No.: 11/393,427

(22) Filed: Mar. 30, 2006

(65) Prior Publication Data

US 2007/0227467 A1    Oct. 4, 2007

(51) Int. Cl.
*F24H 9/16* (2006.01)

(52) U.S. Cl. .................................. 122/14.3

(58) Field of Classification Search ........... 122/14.3, 122/429, 13.01
See application file for complete search history.

(56) References Cited

U.S. PATENT DOCUMENTS

| | | | |
|---|---|---|---|
| 1,790,357 A | 1/1931 | Stack | |
| 2,123,809 A | 7/1938 | Seitz | |
| 2,207,057 A | 7/1940 | Gulick | |
| 2,348,901 A | 5/1944 | Handley | |
| 2,592,863 A | 4/1952 | Connor | |
| 2,602,465 A | 7/1952 | Goehring | |
| 2,708,914 A | 5/1955 | Cooper | |
| 2,766,200 A | 10/1956 | Kaufman | |
| 2,809,267 A | 10/1957 | Schauer, Jr. | |
| 3,062,233 A | 11/1962 | Hammersley | |
| 3,144,904 A | 8/1964 | Kahn et al. | |
| 3,158,177 A | 11/1964 | Schulz et al. | |
| 3,285,241 A | 11/1966 | Bordeaux | |
| 3,447,560 A | 6/1969 | Dodson et al. | |
| 3,465,123 A | 9/1969 | Harris | |
| 3,666,918 A | 5/1972 | Clark, Jr. et al. | |
| 3,672,444 A | 6/1972 | Lowe | |
| 3,688,839 A | 9/1972 | Kirschner | |
| 3,726,475 A | 4/1973 | Eising | |
| 3,762,395 A | 10/1973 | Taylor | |
| 3,776,456 A * | 12/1973 | Eising | ........................ 236/93 R |
| 3,807,365 A | 4/1974 | Lyman et al. | |
| 4,060,057 A | 11/1977 | Carteus et al. | |
| 4,060,472 A | 11/1977 | Alewitz | |

(Continued)

FOREIGN PATENT DOCUMENTS

DE    4236967    5/1993

(Continued)

*Primary Examiner*—Gregory A Wilson
(74) *Attorney, Agent, or Firm*—RatnerPrestia (57) ABSTRACT

A water heater inlet conduit having a top end portion configured to be coupled to an inlet port of a water heater is provided. The bottom end portion of the inlet conduit is configured to extend into an interior of the water heater. A passage within the inlet conduit is provided for water flow from the top end portion to the bottom end portion. The top end portion of the inlet conduit defines at least one outlet opening configured to divert a portion of the water flow outwardly from the passage in the top end portion of the inlet conduit. The top end portion of the inlet conduit further defines at least one inlet opening configured to draw water inwardly into the passage in the top end portion of the inlet conduit.

7 Claims, 6 Drawing Sheets

U.S. PATENT DOCUMENTS

| | | | |
|---|---|---|---|
| 4,157,077 | A | 6/1979 | Lindahl |
| 4,257,355 | A | 3/1981 | Cook |
| 4,263,879 | A | 4/1981 | Lindahl |
| 4,286,573 | A | 9/1981 | Nickel |
| 4,294,310 | A | 10/1981 | Reusch et al. |
| 4,302,338 | A | 11/1981 | Pfohl et al. |
| 4,403,137 | A | 9/1983 | Glazer |
| 4,409,958 | A | 10/1983 | Fillios |
| 4,414,464 | A | 11/1983 | Cloutier |
| 4,503,810 | A | 3/1985 | Fujishita et al. |
| 4,505,231 | A | 3/1985 | Syler |
| 4,510,922 | A | 4/1985 | Roussos et al. |
| 4,549,525 | A | 10/1985 | Narang |
| 4,632,065 | A | 12/1986 | Kale |
| 4,662,314 | A | 5/1987 | Moore, Jr. |
| 4,680,446 | A | 7/1987 | Post |
| 4,735,174 | A | 4/1988 | Crump |
| 4,739,728 | A | 4/1988 | Kale |
| 4,817,564 | A | 4/1989 | Akkala et al. |
| 4,838,211 | A | 6/1989 | Vago |
| 4,870,927 | A | 10/1989 | Sundheimer |
| 4,898,124 | A | 2/1990 | Granberg et al. |
| 4,898,150 | A | 2/1990 | Lewis |
| 4,911,108 | A | 3/1990 | Akkala et al. |
| 4,917,146 | A | 4/1990 | Sundheimer et al. |
| 4,948,948 | A | 8/1990 | Lesage |
| 4,949,680 | A | 8/1990 | Kale |
| 4,951,614 | A | 8/1990 | Akkala et al. |
| 4,954,172 | A | 9/1990 | Houle et al. |
| 4,964,394 | A | 10/1990 | Threatt |
| 5,054,437 | A | 10/1991 | Kale |
| 5,092,279 | A | 3/1992 | Barmore |
| 5,137,053 | A | 8/1992 | Kale |
| 5,277,171 | A | 1/1994 | Lannes |
| 5,341,770 | A * | 8/1994 | Lannes ............... 122/383 |
| 5,365,891 | A | 11/1994 | Hanning |
| 5,421,404 | A | 6/1995 | Kale |
| 5,588,088 | A | 12/1996 | Flaman |
| 5,592,969 | A | 1/1997 | Reichert |
| 5,596,952 | A | 1/1997 | Lannes et al. |
| 5,741,458 | A | 4/1998 | Rowley |
| 5,787,229 | A | 7/1998 | Liljegren |
| 5,809,941 | A | 9/1998 | Allaire |
| 5,943,984 | A | 8/1999 | Lannes |
| 5,988,117 | A | 11/1999 | Lannes |
| 6,138,614 | A * | 10/2000 | Shropshire ............ 122/13.3 |
| 6,199,515 | B1 | 3/2001 | Clarke |
| 6,267,085 | B1 | 7/2001 | Alphs |
| 6,295,411 | B1 | 9/2001 | Fastman |
| 6,311,646 | B1 | 11/2001 | Selmani |
| 6,390,029 | B2 | 5/2002 | Alphs |
| 6,510,819 | B1 | 1/2003 | Pollock et al. |
| 6,532,906 | B1 | 3/2003 | Knoeppel et al. |
| 6,553,947 | B2 * | 4/2003 | Bradenbaugh ............ 122/14.3 |
| 6,633,726 | B2 | 10/2003 | Bradenbaugh |
| 6,745,723 | B1 | 6/2004 | Hicks et al. |
| 6,785,466 | B1 | 8/2004 | Jackson et al. |
| 7,203,418 | B1 * | 4/2007 | York et al. ............ 392/449 |
| 2002/0066419 | A1 | 6/2002 | Bradenbaugh |

FOREIGN PATENT DOCUMENTS

| | | |
|---|---|---|
| DE | 102004059910 | 5/2006 |
| EP | 0881438 A2 | 12/1998 |
| FR | 2488422 | 2/1982 |
| GB | 648213 | 1/1951 |
| JP | 58123041 | 7/1983 |
| JP | 60129554 | 7/1985 |
| WO | WO 02/053988 A2 | 7/2002 |

* cited by examiner

APPARATUS AND METHOD FOR DELIVERING WATER INTO A WATER HEATER

FIELD OF THE INVENTION

The present invention relates to a water heater and more particularly an apparatus and method for delivering water into a water heater.

BACKGROUND OF THE INVENTION

There is a continuing need to further improve the thermal efficiency of conventional water heaters, as thermal efficiency improvements facilitate energy conservation and represent cost savings to the end user. In an effort to improve thermal efficiency, it is generally beneficial to maintain a substantially uniform water temperature within the water heater tank. However, the water temperature tends to be cooler near the bottom of the water heater tank and rises as the water level approaches the top of the water heater tank. In other words, as a result of thermal currents within the water heater, the thermal energy is driven towards the top of the water heater tank. This phenomena, commonly known as stacking or thermal stratification, has an adverse impact on the energy efficiency of a water heater.

Thermal stratification within a water heater tank decreases a water heater's First-Hour rating, which is a measure of the volume of hot water a water heater can supply in a one-hour time period. The First-Hour rating is an industry-wide indicator used to establish the thermal efficiency of a water heater. Water Heater manufacturers continually strive to increase the First-Hour rating.

Improvements have been made in this regard. For example, improved water heater systems are disclosed in U.S. Pat. No. 5,341,770, which illustrates a water heater cold water inlet deflector means which can create turbulent flow within the inlet conduit and create turbulent water circulation throughout the water storage tank so that sediment is disturbed and suspended, stacking is prevented and efficiency is improved.

Nevertheless, there continues to be a need to further reduce thermal stratification within a water heater tank to improve the thermal efficiency of water heaters and/or to reduce the impact of any such thermal stratification.

SUMMARY OF THE INVENTION

In one exemplary embodiment, this invention provides a water heater inlet conduit having a top end portion configured to be coupled to an inlet port of a water heater, a bottom end portion configured to extend into an interior of the water heater, and a passage for water flow from the top end portion to the bottom end portion. The top end portion of the inlet conduit has at least one outlet opening configured to divert a portion of the water flow outwardly from the passage in the top end portion of the inlet conduit. The top end portion of the inlet conduit also has at least one inlet opening configured to draw water inwardly into the passage in the top end portion of the inlet conduit.

In another exemplary embodiment, the invention provides means located at the top end portion of the inlet conduit for drawing water into the passage of the inlet conduit from the water storage tank. This embodiment of the invention also provides means located at the bottom end portion of the inlet conduit and spaced from the outlet opening for diverting a portion of the water flow from the passage of the inlet conduit into the water storage tank.

In yet another exemplary embodiment, this invention provides means located at the top end portion of the inlet conduit for diverting a portion of the water flow from the passage of the inlet conduit into the water storage tank. This embodiment of the invention additionally provides means located at the bottom end portion of the inlet conduit and spaced from the outlet opening for drawing water into the passage of the inlet conduit from the water storage tank.

In still another exemplary embodiment, this invention provides a method for delivering water into a water heater. The method includes the step of diverting a portion of water flow from a passage of an inlet conduit and into a top interior segment of the water heater. The method further includes the step of drawing water from the top interior segment of the water heater into the passage of the inlet conduit. The method further includes the step of delivering water flow from the passage of the inlet conduit into a bottom interior segment of the water heater through an outlet opening of the inlet conduit.

In yet another exemplary embodiment, this invention provides another method for delivering water into a water heater. The method includes the step of delivering water flow through a passage of an inlet conduit into a bottom interior segment of the water heater through an outlet opening in a bottom end of the inlet conduit. The method further includes the step of supplementing the water flow in the passage of the inlet conduit with water drawn from a top interior segment of the water heater into a top end portion of the inlet conduit. The method further includes the step of diverting a portion of the water flow from the passage of the inlet conduit and into the bottom interior segment of the water heater through an opening in a bottom end portion of the inlet conduit and spaced from the outlet opening.

In still another exemplary embodiment, this invention provides another method for delivering water into a water heater. The method includes the step of delivering water flow through a passage of an inlet conduit into a bottom interior segment of the water heater through an outlet opening in a bottom end of the inlet conduit. The method further includes the step of diverting a portion of the water flow from the passage of the inlet conduit and into a top interior segment of the water heater through an opening in a top end portion of the inlet conduit. The method further includes the step of supplementing the water flow in the passage of the inlet conduit with water drawn from a bottom interior segment of the water heater into a bottom end portion of the inlet conduit.

DETAILED DESCRIPTION OF THE INVENTION

Although the invention is illustrated and described herein with reference to specific embodiments, the invention is not intended to be limited to the details shown. Rather, various modifications may be made to the illustrated embodiments within the scope and range of equivalents of the claims and without departing from the invention. Also, the embodiments selected for illustration in the figures are not shown to scale and are not limited to the proportions shown.

In an exemplary embodiment, this invention provides an inlet conduit configured to deliver water into a water heater. With general reference to the figures, the water heater 10, 10a, 110, 210 includes an inlet conduit 30, 130, 230 having a top end portion 5a, 105a configured to be coupled to an inlet port 28, 128 of a water heater, a bottom end portion 5b, 105b configured to extend into an interior of the water heater, and a passage for water flow from the top end portion 5a, 105a to the bottom end portion 5b, 105b. The top end portion 5a, 105a of the inlet conduit 30, 130, 230 has at least one outlet opening 34, 134 configured to divert a portion of the water flow outwardly from the passage in the top end portion 5a, 105a of the inlet conduit. The top end portion 5a, 105a of the inlet conduit 30, 130, 230 also has at least one inlet opening 44, 144 configured to draw water inwardly into the passage in the top end portion of the inlet conduit.

In another exemplary embodiment, this invention provides an inlet conduit having a top end portion like top end portion 5a, 105a configured to be coupled to an inlet port 28, 128 of a water heater 10, 10a, 110, 210, a bottom end portion like bottom end portion 5b, 105b configured to extend into an interior of the water heater, a passage for water flow from the top end portion to the bottom end portion, and an outlet opening like outlet opening 74 at a bottom end of the inlet conduit. This invention provides means such as opening 44, 104 located at the top end portion of the inlet conduit for drawing water into the passage of the inlet conduit from a water storage tank such as water storage tank 11, 111, 211. In addition, this invention provides means such as opening 34, 134 located at the bottom end portion of the inlet conduit and spaced from the outlet opening for diverting a portion of the water flow from the passage of the inlet conduit into the water storage tank.

In yet another exemplary embodiment, this invention provides means such as opening 34, 134 located at the top end portion of the inlet conduit for diverting a portion of the water flow from the passage of the inlet conduit into the water storage tank. The invention additionally provides means such as opening 44, 144 located at the bottom end portion of the inlet conduit and spaced from the outlet opening for drawing water into the passage of the inlet conduit from the water storage tank.

In still another exemplary embodiment, this invention provides a method for delivering water into a water heater 10, 10a, 110, 210. Referring for example to the water heater embodiments illustrated in the figures, the method includes the step of diverting a portion of water flow from a passage of an inlet conduit 30, 130, 230 and into a top interior segment 59 of the water heater. The method further includes the step of drawing water from the top interior segment 59 of the water heater into the passage of the inlet conduit 30, 130, 230. The method further includes the step of delivering water flow from the passage of the inlet conduit 30, 130, 230 into a bottom interior segment 60 of the water heater through an outlet opening 74 of the inlet conduit.

In yet another exemplary embodiment, this invention provides another method for delivering water into a water heater 10, 10a, 110, 210. The method includes the step of delivering water flow through a passage of an inlet conduit 30, 130, 230 into a bottom interior segment 60 of the water heater through an outlet opening 74 in a bottom end of the inlet conduit 30, 130, 230. The method further includes the step of supplementing the water flow in the passage of the inlet conduit with water drawn from a top interior segment 59 of the water heater 10, 10a, 110, 210 into a top end portion 5a, 105a of the inlet conduit. The method further includes the step of diverting a portion of the water flow from the passage of the inlet conduit 30, 130, 230 and into the bottom interior segment 60 of the water heater through an opening 34, 134 in a bottom end portion 5b, 105b of the inlet conduit and spaced from the outlet opening 74.

In still another exemplary embodiment, this invention provides another method for delivering water into a water heater 10, 10a, 110, 210. The method includes the step of delivering water flow through a passage of an inlet conduit 30, 130, 230 into a bottom interior segment 60 of the water heater through an outlet opening 74 in a bottom end of the inlet conduit. The method further includes the step of diverting a portion of the water flow from the passage of the inlet conduit 30, 130, 230 and into a top interior segment 59 of the water heater through an opening 34, 134 in a top end portion 5a, 105a of the inlet conduit. The method further includes the step of supplementing the water flow in the passage of the inlet conduit 30, 130, 230 with water drawn from a bottom interior segment 60 of the water heater into a bottom end portion 5b, 105b of the inlet conduit.

Figure 1:
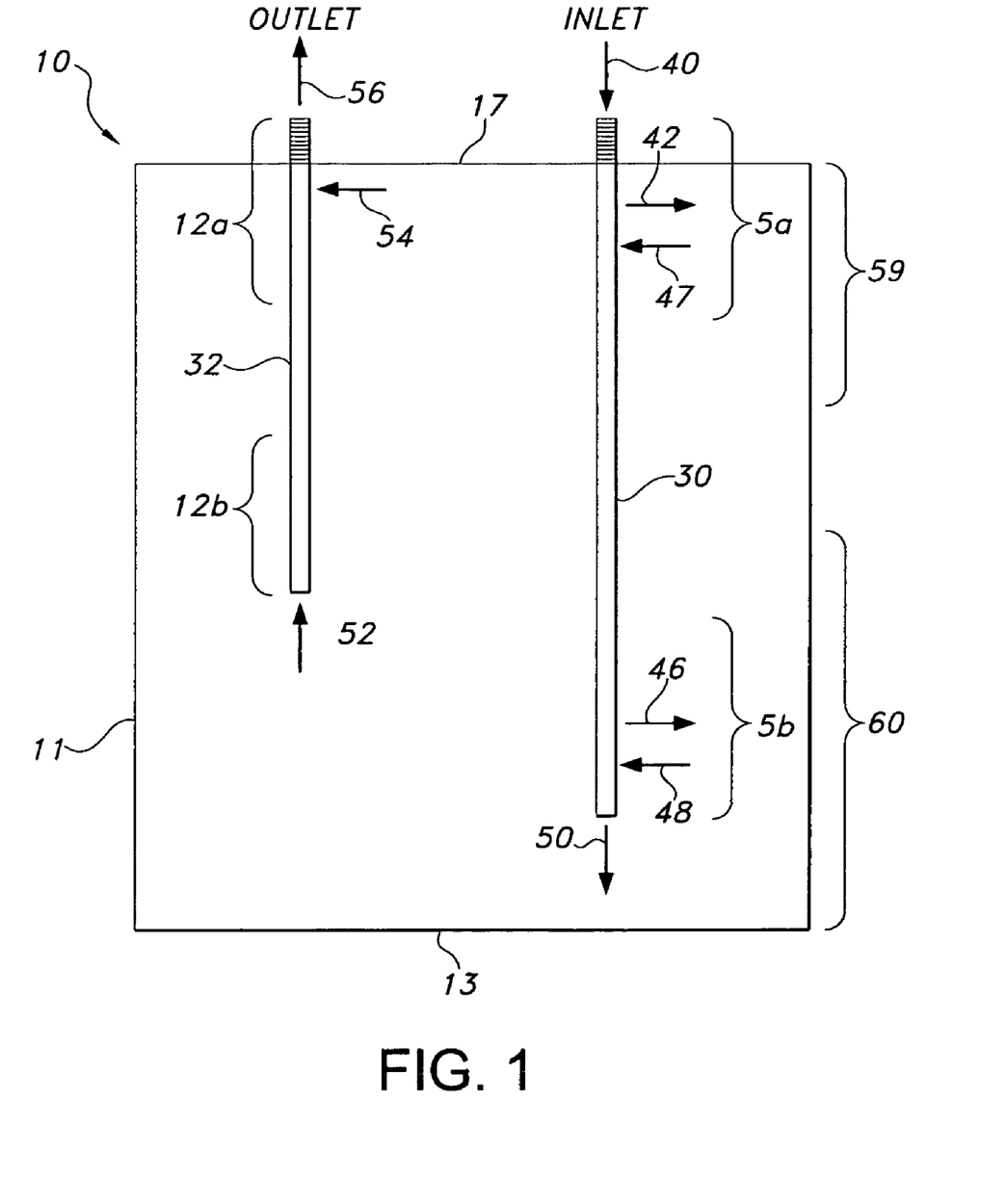
FIG. 1 is a schematic view of an embodiment of a water heater illustrating exemplary water flow patterns according to aspects of this invention.

In one exemplary embodiment, FIG. 1 illustrates schematically the flow of water through a water heater designated generally by the numeral "10". The water heater 10 is provided with a water tank 11, an inlet conduit 30 and an outlet conduit 32. The water tank 11, having a top end portion or region 59 and a bottom end portion or region 60, is configured to store water (or any other fluid), and is provided with a tank head 17 and tank base 13. The inlet conduit 30 is connected to the tank head 17 and extends into the interior of the water tank 11. The outlet conduit 32 is also connected to the tank head 17 and extends into the interior of the water tank 11. The inlet conduit 30 has a top end portion 5a and a bottom end portion 5b. The outlet conduit 32 also has a top end portion 12a and bottom end portion 12b.

In use, a supply of unheated or cold water 40 is introduced into the inlet conduit 30 and directed through the top end portion 5a of the inlet conduit 30. The top end portion 5a of the inlet conduit 30 is provided with means to divert a portion of the cold water flow from the inlet conduit 30 into the top end portion 59 of water tank 11 (the diverted flow is designated schematically by the numeral 42 in FIG. 1). The cold water flow 42 diverted from the inlet conduit 30 is mixed with the warmer water residing in the top end portion 59 of the water tank 11, thereby moderating or decreasing the temperature of the water in the top end portion 59 of the water tank 11. The means to divert water flow can be selected from a variety of known structures capable of diverting fluid flow.

The top end portion 5a of the inlet conduit 30 is additionally provided with means to draw a portion of the water stored within the top end portion 59 of the water tank 11 into the top end portion 5a of the inlet conduit 30 (the siphoned water flow schematically designated by the numeral 47). The water drawn from the top end portion 59 of the water tank 11 is mixed with the cooler water in the top end portion 5a of the inlet conduit 30, thereby increasing or tempering the temperature of the water in the top end portion 5a of the inlet conduit 30 as it flows into the water tank 11 from the inlet. The means to draw water can be selected from a variety of known structures capable of drawing fluid.

Accordingly, it has been discovered that the means for diverting and means for drawing water positioned at the top end portion 5a of the inlet conduit 30 provide several advantages. The cool water flow 42 diverted into the top end portion 59 of the water tank 11 combined with the warmer water flow 47 siphoned into the top end portion 5a of the inlet conduit 30 help to reduce thermal stratification to provide a more uniform temperature of the water within the water tank 11. The hottest water in the top end portion 59 of water tank 11 is tempered with the inclusion of cooler water diverted from the top end portion 5a of the inlet conduit 30. Furthermore, the coolest water in the bottom end portion 60 of water tank 11 is tempered with the inclusion of warmer water drawn from the top end portion 59 of the water tank 11 through the inlet conduit 30.

Alternatively, means for diverting and means for drawing water positioned at the bottom end portion 5b of the inlet conduit 30 provide a different benefit than the means for diverting and drawing water positioned at the top end portion 5a of the inlet conduit 30, as described in further detail below.

In use, the bottom end portion 5b of the inlet conduit 30 is provided with means to divert a portion of the water flow from the inlet conduit 30 and into the bottom end portion 60 of water tank 11 (the diverted flow is designated schematically by the numeral 46). The water diverted at 46 from the inlet conduit 30 increases mixing of the water residing at the bottom end portion 60 of the water tank 11. Such mixing tends to improve the uniformity of temperature within the water tank 11.

Additionally, the water flow 46 diverted from the bottom end portion 5b of the inlet conduit 30, combined with the water flow 48 siphoned into the bottom end portion 5b of the inlet conduit 30 (described below), induces turbulent conditions within the bottom end portion 60 of the water tank 11. As described by Lannes in U.S. Pat. No. 5,341,770, which is herein incorporated by reference in its entirety, turbulent flow reduces the buildup of sediment on the inside surfaces of the water tank 11, particularly sediment accumulated on the tank base 13 of the water tank 11.

The bottom end portion 5b of the inlet conduit 30 is additionally provided with means to draw a portion of the water stored within the bottom end portion 60 of the water tank 11 into the passage of the inlet conduit 30 (the siphoned water flow designated schematically by the numeral 48). The water flow drawn into the bottom end portion 5b of the inlet conduit 30 is mixed with the water flowing through the bottom end portion 5b of the inlet conduit 30.

The remaining flow of water through the inlet conduit 30 is introduced into the bottom end portion 60 of the water tank 11 (the flow designated schematically by the numeral 50). In other words, the sum of flows 40, 47, and 48, minus the flows 42 and 46, exits the inlet 30 as flow 50. Put differently, the sum of flows 40, 47, and 48 will equal the sum of flows 42, 46, and 50.

The outlet conduit 32 permits withdrawal of heated water from the water tank 11 (e.g., for domestic use or consumption). The bottom end portion 12b of the outlet conduit 32 is provided with at least one opening to draw a portion of the water stored within the water tank 11. By virtue of the elongated outlet conduit 32 of this embodiment, the opening in the bottom end portion 12b draws water from a lower elevation of the water tank 11 and can therefore draw water that may be in a cooler region of the water tank 11. For example, according to one particular embodiment, the bottom end portion 12b of the outlet conduit 32 optionally extends into the bottom end portion 60 of the water tank 11.

Independent of the length selected for the outlet conduit 32, and independent of whether the outlet conduit 32 extends into the bottom end portion 60 of the water tank 11, the bottom end portion 12b of the outlet conduit 32 preferably includes an opening for water to enter the outlet conduit 32 from the water tank 11 (the siphoned water flow designated schematically by the numeral 52). That water flow forms part of the water flow delivered to the consumer of the heated water.

The top end portion 12a of the outlet conduit 32 is also provided with at least one opening to draw a portion of the water stored within the top end portion 59 of the water tank 11 (the siphoned water flow designated schematically by the numeral 54). The water flow 54 drawn into the top end portion 12a of the outlet conduit 32 is mixed with the cooler water flow drawn from the bottom end portion 12b of the outlet conduit 32 from the water tank 11.

It will be understood, therefore, that the water drawn from the outlet of the water heater 10 at 56 is a mixture of water drawn from at least two different elevations within the water tank 11. The water at these elevations tends to be at different temperatures as the result of natural thermal principles. Therefore, the temperature of the water drawn at 56 will be between the temperatures of the water drawn at 52 and that drawn at 54. Also, it will be understood that the volumetric flow of water drawn at 56 will be the sum of the water drawn at 52 and 54.

Figure 2:
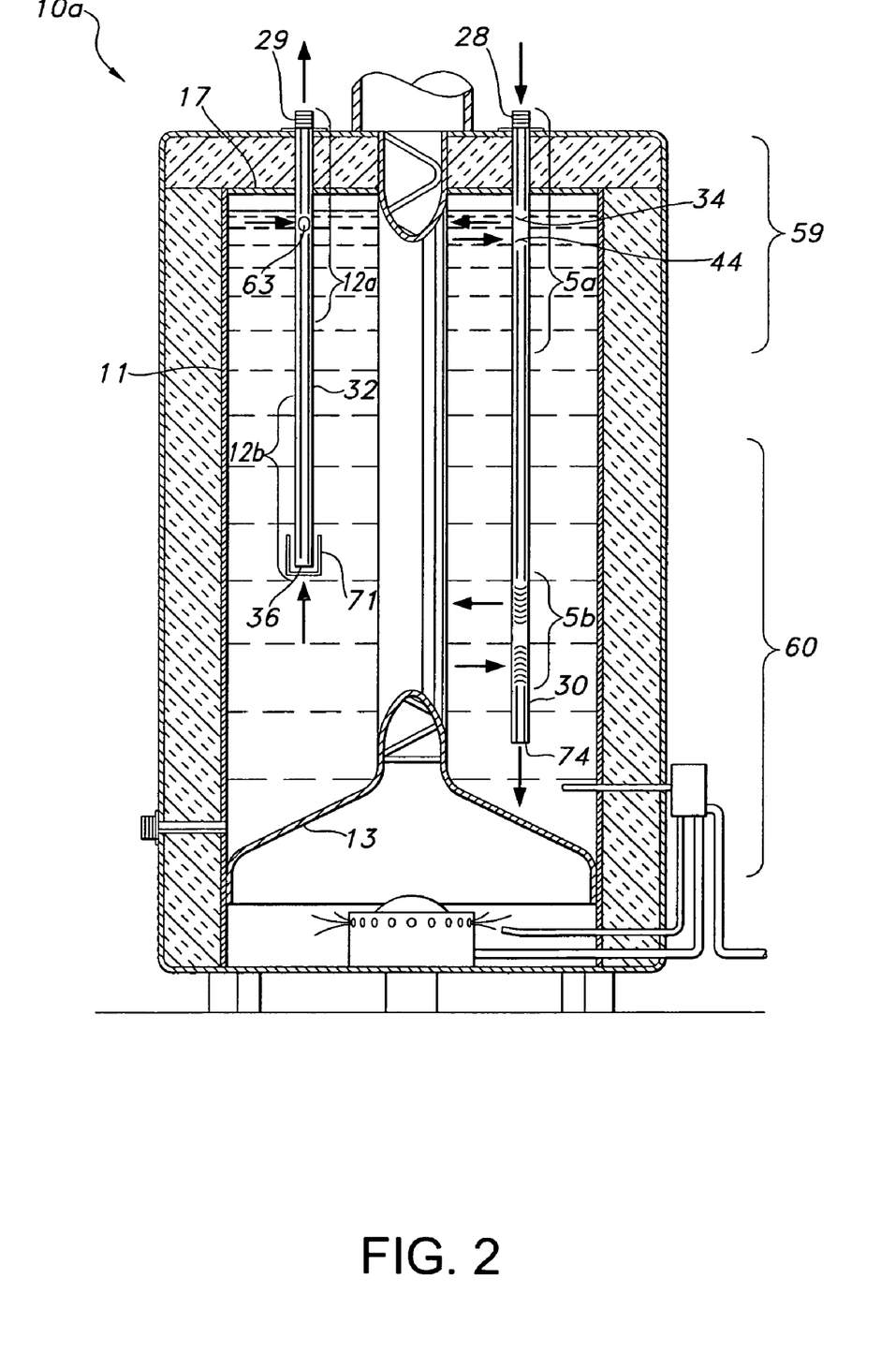
FIG. 2 is a cross-sectional side view of a gas-fired water heater in accordance with an exemplary embodiment of the present invention.

Referring to FIG. 2, the gas water heater 10a has a water tank 11 with a tank head 17 and tank base 13. Water heater 10a is similar to water heater 10 illustrated in FIG. 1 except for the differences pointed out in the following paragraphs.

A cold water inlet port 28 and a hot water outlet port 29 are extended from the tank head 17 for the delivery and withdrawal of water from the water heater 10a. The cold water inlet port 28 may optionally have a heat trap or nipple fitting. An inlet conduit 30 having a top end portion 5a and a bottom end portion 5b is attached at the cold water inlet port 28. The top end portion 5a of the inlet conduit includes at least one outlet and at least one inlet for flow out of and into the inlet conduit, respectively, as illustrated schematically in FIG. 2 by the arrows. For example, and according to one non-limiting embodiment of the inlets and outlets, the embodiment of FIG. 2 illustrates diverting means comprising plural outlets in the form of smile shaped notches 34 and drawing means comprising plural inlets in the form of frown shaped notches 44. Other forms of diverting and drawing means are optionally substituted.

The smile shaped notches 34 are provided as a means to divert a portion of the cold water flow from the inlet conduit 30 into the top end portion 59 of water tank 11. While smile shaped notches 34 provide one means for diverting water flow from the inlet conduit, other equivalent means are contemplated. For example, the water diverting means can be one or more aperture, hole, opening, slot, nozzle, valve, projection, dimple, slit, lip, channel, fin, groove, surface or other equivalent structure capable of diverting or otherwise permitting the flow of water from within a fluid passage to an interior region of a water tank.

The frown shaped notches 44 are provided as a means to draw a portion of the water stored within the top end portion 59 of the water tank 11 into the top end portion 5a of the inlet conduit 30. While frown shaped notches 44 provide one means for drawing water into the inlet conduit, other equivalent means are contemplated. For example, the water drawing means can be one or more aperture, hole, opening, slot, nozzle, valve, projection, dimple, slit, lip, channel, fin, groove, surface or other equivalent structure capable of drawing or otherwise permitting the flow of water from within an interior region of a water tank to a fluid passage.

The outlet conduit 32 having a top end portion 12a and bottom end portion 12b is attached at the hot water outlet port 29. The outlet conduit 32 is provided with an opening 36 at a bottom end of the outlet conduit 32 so that water from within the water tank 11 can be drawn into the outlet conduit 32. In the embodiment illustrated in FIG. 2, the opening 36 of the outlet conduit 32 is positioned to draw water from a bottom interior region 60 of the water tank 11.

Figure 10:
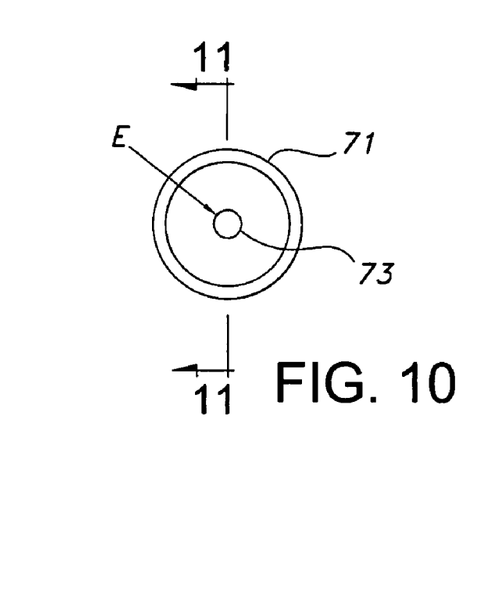
FIG. 10 is a top end view of an embodiment of an outlet conduit cap in accordance with an aspect of the present invention.
Figure 11:
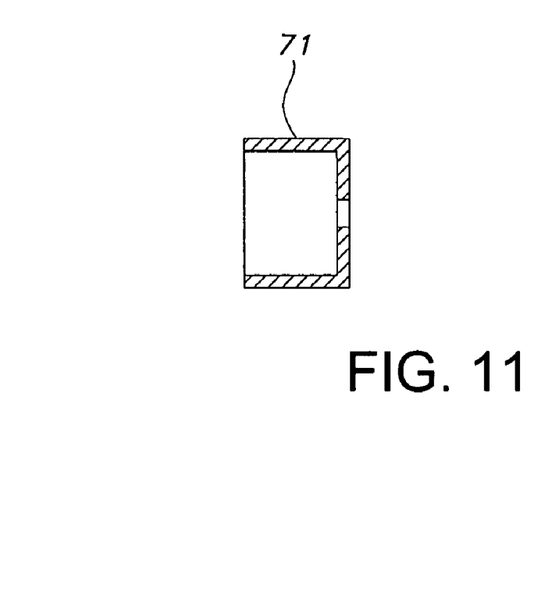
FIG. 11 is a cross-sectional side view of the outlet conduit cap shown in FIG. 10 as defined by Section "11-11".

In order to reduce the size of the opening 36 (e.g., to make opening 36 smaller than the inside cross-sectional area of the outlet conduit 32), the outlet conduit 32 is provided with a cap 71. Details of an exemplary cap 71 are shown in FIGS. 10 and 11. Instead of cap 71, however, other means can be used to define the size of the opening 36. For example, the size of the opening can be defined by a plug with an aperture, a reducer, a necked-down portion of the outlet conduit or any equivalent structure capable of impacting the size of the orifice in the bottom end of the outlet conduit 32.

The outlet conduit 32 also provides at least one opening 63 in a top end portion 12a of the outlet conduit 32. The opening 63 allows water to be drawn into the top end portion 12a of the outlet conduit 32 from the top interior segment 59 of the water tank 11. The opening 63 is positioned to draw water from a region of the water tank 11 where the water temperature tends to be higher by action of thermal effects within the water tank 11.

Figure 3A:
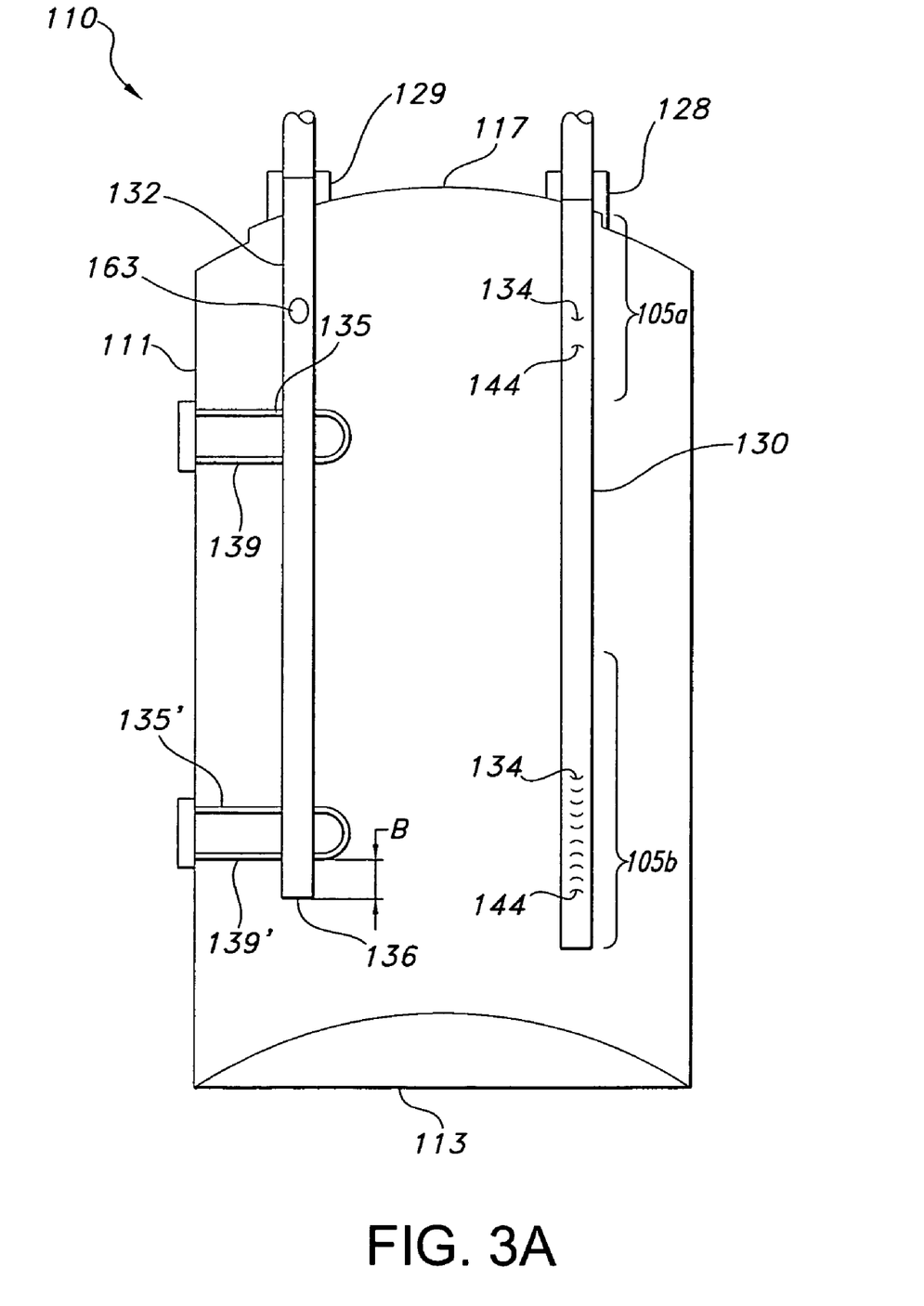
FIG. 3A is a cross-sectional side view of an electric water heater in accordance with an exemplary embodiment of the present invention.

Referring to another embodiment of a water heater illustrated in FIG. 3a, the inlet conduit and outlet conduit are additionally adapted for operation with an electric water heater. In this illustrated embodiment, an electric water heater 110 has a water tank 111 including a tank head 117 and a tank base 113. At least two heating elements 135 and 135' extend through a wall of the water tank 111 providing heat to the internal water contained within the water tank 111. A top heating element 135 is positioned above a bottom heating element 135'. An inlet conduit 130 is attached at a cold water inlet port 128 of the water heater 110. An outlet conduit 132 is attached at a hot water outlet port 129 of the water heater 110.

To enhance the first hour rating, the inlet end 136 of the outlet conduit 132 is configured to extend to an elevation below that of a lower portion 139' of the bottom heating element 135', as designated by dimension "B". The dimension "B" optionally corresponds to a distance greater than or equal to about 1 inch. By providing the outlet conduit 132 with a length such that the inlet end 136 is below the heating element 135, the outlet conduit 132 will draw water from the water tank 111 at an elevation below the bottom heating element 135'. However, the efficiency (according to a standard use test) of the water heater may be diminished since the inlet end 136 draws water from the relatively cooler lower region of tank 111.

Similar to the water heater embodiment illustrated in FIG. 2, the water heater 110 shown in FIG. 3a includes a water inlet conduit 130 having water outlets and inlets in the form of notches 134 and 144, respectively, in a top end portion 105a of the inlet conduit 130. Also, the inlet conduit 130 includes water outlets and inlets in the form of notches 134 and 144, respectively, in a bottom end portion 105b of the inlet conduit 130. The purpose and function of these inlet and outlet openings in the inlet conduit 130 are the same as those described previously with reference to FIG. 2.

Figure 3B:
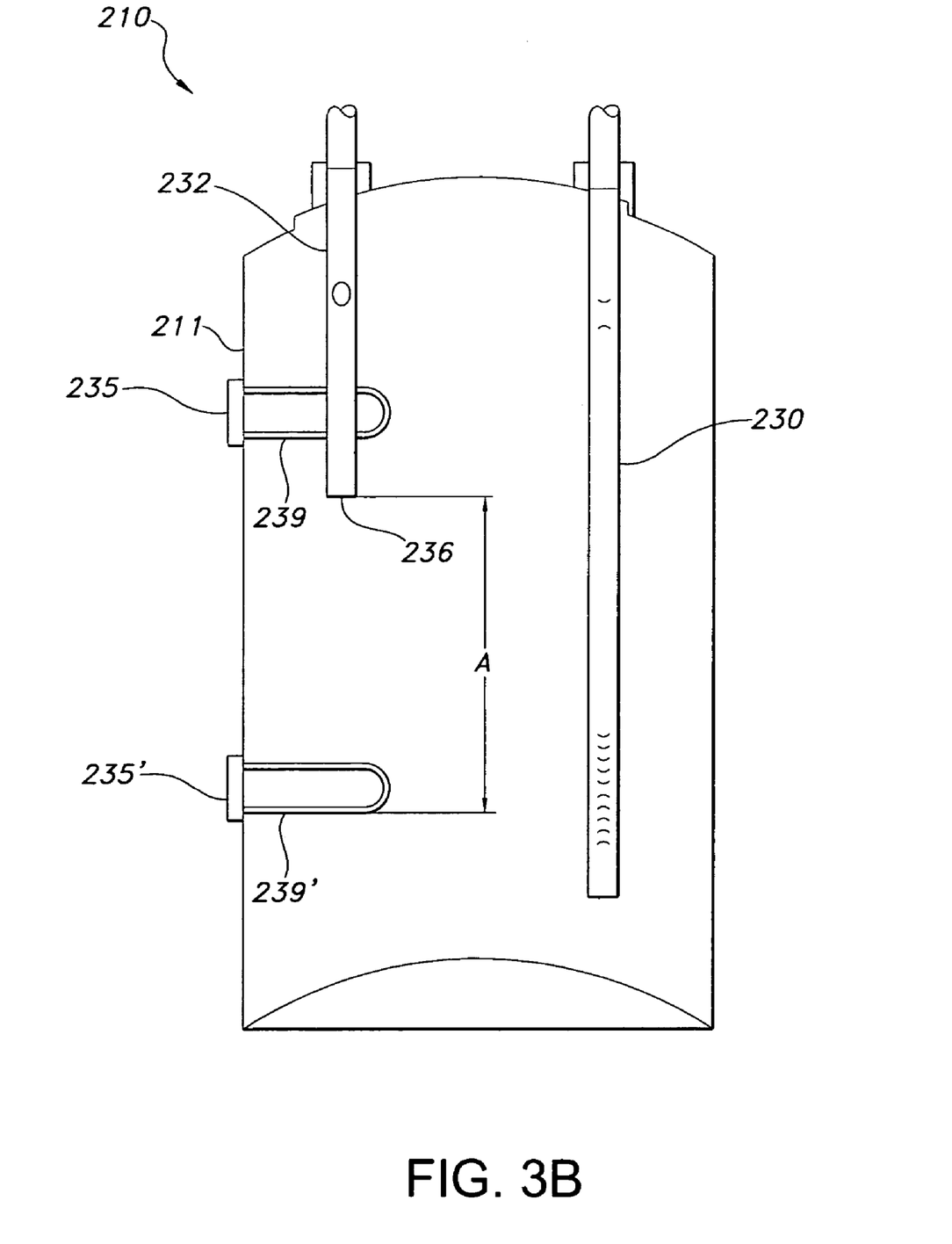
FIG. 3B is a cross-sectional side view of another exemplary embodiment of an electric water heater according to aspects of this invention.

Referring to FIG. 3b, an alternate embodiment of an electric water heater, generally designated by the numeral 210, is illustrated. As in water heater 110, an outlet conduit 232 attached to the electric water heater 210 is shown. Unlike the water heater 110, the inlet end 236 of the outlet conduit 232 is configured to extend to an elevation between the heating elements 235 and 235'. As illustrated in FIG. 3b, the distance separating the inlet end 236 of the outlet conduit 232 and the lower end 239' of the bottom heating element 235' is designated by dimension "A". The dimension "A" optionally corresponds to a volume of water, or other fluid, of at least about 11 gallons in the water heater 210. In other words, the volume of water contained in the water heater 210 between the elevation of the lower portion 239' of the heating element 235' and the end opening 236 of the outlet conduit 232 is at least about 11 gallons, so long as the inlet end 236 of the outlet conduit 232 is positioned below the top heating element 235. It has been discovered that both the first hour rating and efficiency (according to a standard use test) of the water heater are optimized in this configuration of the electric water heater 210.

Figure 4:
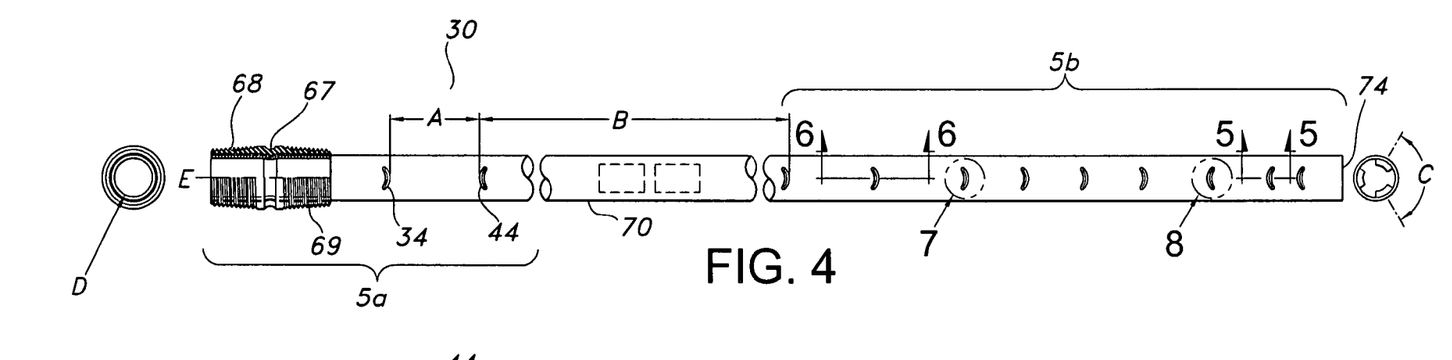
FIG. 4 is a side view of an embodiment of an inlet conduit in accordance with aspects of the present invention.

Referring now to FIGS. 4 through 8, details of an exemplary embodiment of inlet conduit 30 are illustrated. Specifically, FIG. 4 illustrates an inlet conduit 30 comprising a tube 70, a nipple 67 attached to the tube 70, a top end portion 5a and a bottom end portion 5b. The top end portion 5a of the inlet conduit 30 provides smile shaped notches 34 and frown shaped notches 44. The smile shaped notches 34 are provided as a means to divert a portion of the cold water flow from the inlet conduit 30 into the top end portion 59 of water tank 11. The frown shaped notches 44 are provided as a means to draw a portion of the water stored within the top end portion 59 of the water tank 11 into the top end portion 5a of the inlet conduit 30. The bottom end 74 of the inlet conduit 30 is configured to expel the remaining flow of water from within the inlet conduit 30 into the bottom end portion 60 of the water tank 11.

The smile and frown shaped notches positioned at the top end portion 5a of the inlet conduit 30 reduce thermal stratification to provide a more uniform water temperature within the water tank 11 and help to compensate for the thermal effects that occur within the water tank 11. These features are described in further detail below. The smile and frown shaped notches positioned at the bottom end portion 5b of the inlet conduit 30, which induce turbulent water flow within the bottom end portion 60 of the water tank 11, can adopt structures such as those disclosed in Lannes in U.S. Pat. No. 5,341,770, which is incorporated herein by reference.

In the embodiment illustrated in FIGS. 4 through 8, three smile shaped notches 34 are formed on the top end portion 5a of the inlet conduit 30. The three smile shaped notches are positioned on the same radial plane and are separated by a distance "A" from the frown shaped notches 44. Although a single radial plane of three smile shape notches 34 is shown, a plurality of radial planes each comprising an alternative number of smile shape notches 34 is envisioned. The dimension "A" separating the smile shaped notches 34 from the frown shaped notches 44 may be about 1½ inches, but may be any other larger or smaller dimension as long as the smile shaped notches 34 are positioned along the top end portion 5a of the inlet conduit. The angle "C" separating the three smile shaped notches positioned on their respective radial plane may be, for example, 120 degrees, however the angle may be any other larger or smaller angle sufficient to draw water from within the water tank 11. The angle "C" is also dependent upon the number of notches in each plane and other design factors.

Three frown shaped notches 44 are formed on the top end portion 5a of the inlet conduit tube 70 proximal to the nipple 67. The frown shaped notches are positioned on the same radial plane separated by a distance "B" from smile shaped notches 34 positioned on the bottom end portion 5b of the inlet conduit 30. Although the three frown shape notches 44 are positioned on a single radial plane as illustrated in FIG. 4, a plurality of radial planes each comprising an alternative number of frown shape notches 44 are envisioned. The dimension "B" separating the frown shaped notches 44 positioned along the top end portion 5a from the smile shaped notches 34 positioned along the bottom end portion 5b of the inlet conduit 30 may be about 8 inches, but may be any other larger or smaller dimension providing the frown shaped notches 44 are positioned along the top end portion 5a of the inlet conduit 30. The angle "C" separating the three frown shaped notches positioned on the radial plane may be, for example, 120 degrees, however the angle may be any other larger or smaller dimension sufficient to divert water (or other fluid) from the inlet conduit 30 and into the top end portion 59 of the water tank 11. Although the frown shaped notches 44 and smile shaped notches 34 are shown radially aligned along longitudinal axis "E", it is envisioned that the notches may be radially misaligned or staggered to alter the flow of water through the inlet conduit 30.

The bottom end portion 5b of the inlet conduit 30 additionally provides smile shaped notches 34 and frown shaped notches 44. The smile shaped notches 34 are provided as one exemplary form of a means to divert a portion of the cold water flow from the inlet conduit 30 and into the bottom end portion 60 of water tank 11. The frown shaped notches 44 are provided as a means to draw a portion of the water stored within the bottom end portion 60 of the water tank 11 and into the bottom end portion 5b of the inlet conduit 30. The smile and frown shaped notches positioned at the bottom end portion 5b of the inlet conduit 30 are provided to induce or promote turbulent water flow within the bottom end portion 60 of the water tank 11.

A nipple 67 is attached to the top end portion 5a of the inlet conduit 30. A surface of the nipple 67 is optionally welded onto the top end portion 5a of the inlet conduit 30 depending upon the materials selected. However, the nipple 67 may be attached to the top end portion 5a via fasteners, a press fit, a rolled groove, high-temperature waterproof adhesive or any other suitable means of securing the components, as the attachment is not limited to welds. The nipple 67 may be a separate component from the inlet conduit 30 as shown or, alternatively, the nipple 67 could be integrated with the inlet conduit 30. The bottom end portion 69 of the nipple 67 is threaded into the cold water inlet port 28. The top end portion 68 of the nipple 67 is attached to an external pipe or tube, not shown. The nipple 67 according to one exemplary embodiment is composed of a metallic material such as zinc plated steel. However, the nipple 67 may be composed of stainless steel, copper, plastic or any other suitable material.

The inner diameter "D" of the inlet conduit tube 70 may be increased or decreased to tailor the velocity and pressure of the flow of water through the inlet conduit tube 70. For example, the inner diameter "D" may be about 0.6 inch, however the inner diameter "D" may be any other larger or smaller dimension sufficient to transport water through the inlet conduit tube 70. The inlet conduit tube 70 is shown in tubular form, however other embodiments such as a square, rectangular, or any other cross-sectional shape can be utilized to transport liquid and are envisioned within the scope of this invention.

The inlet conduit tube 70 may be composed of polypropylene, stainless steel, copper, or any other suitable plastic or metallic material. The inlet conduit tube 70 may be formed using any suitable manufacturing process such as injection molding, casting, machining, stamping, or extrusion, or any combination thereof.

Figures 5, 7:
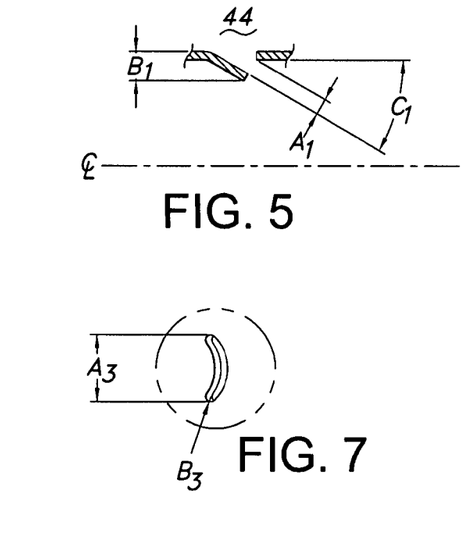
FIG. 5 is a cross-sectional view of one exemplary embodiment of an inlet opening shown in FIG. 4 as defined by Section "5-5"
FIG. 7 is a detailed side view of an outlet opening of the inlet conduit shown in FIG. 6.

FIG. 5 illustrates a cross-sectional view of a frown shaped notch 44. The frown shaped notch 44 is optionally a molded feature integrated with the inlet conduit tube 70. However, other manufacturing methods to form the frown shaped notches 44 are envisioned, such as stamping, punching or any other forming method capable of displacing the inlet conduit tube 70 material. Alternatively, it is envisioned that the frown shaped notches 44 may be discrete components coupled to the exterior or interior of the inlet conduit tube 70.

The gap "A1", deflected height "B1" and the angle "C1" of the frown shaped notch 44, as illustrated in FIG. 5, may be any dimension sufficient to draw water (or other fluid) from the water tank 11 into the inlet conduit 30. For the purposes of illustration only, the gap "A1" may be about 0.07 inch, deflected height "B1" may be about ⅛ inch and the angle "C1" may be about 30 degrees.

Figure 6:
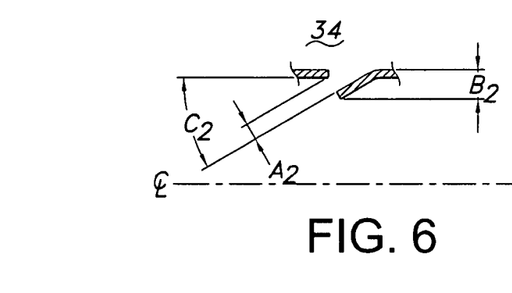
FIG. 6 is a cross-sectional view of one exemplary embodiment of an outlet opening shown in FIG. 4 as defined by Section "6-6"

FIG. 6 illustrates a cross-sectional view of a smile shaped notch 34. The smile shaped notch 34 is a molded feature integrated with the inlet conduit tube 70. However, other manufacturing methods to form the smile shaped notches 34 are envisioned, such as stamping, punching or any other forming method capable of displacing the inlet conduit tube 70 material. Alternatively, it is envisioned that the smile shaped notches 34 may be discrete components coupled to the exterior or interior of the inlet conduit tube 70.

The gap "A2", deflected height "B2" and the angle "C2" of the smile shaped notch 34, as illustrated in FIG. 6, may be any dimension sufficient to divert a portion of the water flow from the inlet conduit 30 into the top end portion 59 of water tank 11. For the purposes of illustration only, the gap "A2" may be about 0.07 inch, deflected height "B2" may be about ⅛ inch and the angle "C2" may be about 30 degrees.

Figure 8:
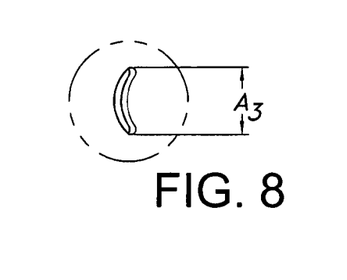
FIG. 8 is a detailed side view of an inlet opening of the inlet conduit shown in FIG. 5.

FIGS. 7 and 8 illustrate a detailed side view of a smile-shaped notch and a frown-shaped notch, respectively. The width "A3" and the slot radius "B3" of the smile and frown shaped notch 34, as illustrated in FIGS. 7 and 8, respectively, may be any dimension sufficient to divert or draw a portion of the water flow from the inlet conduit 30 or into the inlet conduit 30. For the purposes of illustration only, the width "A3" of the smile and frown shaped notches may be about ⅜ inch and the slot radius "B3" of the smile and frown shaped notches may be about 0.03 inch.

Figure 9:
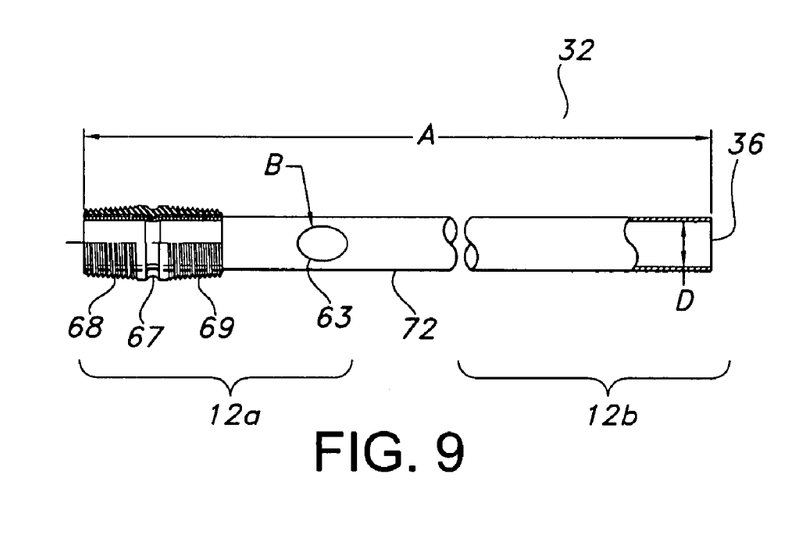
FIG. 9 is a side view of an embodiment of an outlet conduit in accordance with an aspect of the present invention.

FIG. 9 illustrates an exemplary embodiment of an outlet conduit 32 comprising a tube 72, a nipple 67 attached to the tube 72, a top end portion 12a, a bottom end portion 12b and an inlet end 36. The top end portion 12a of the outlet conduit 32 provides an opening 63 configured to draw water stored within the top end portion 59 of the water tank 11 into the top end portion 12a of the outlet conduit 32. The inlet end 36 of the outlet conduit 32 is configured to draw cooler water from the bottom end portion 60 of water tank 11 through the outlet conduit 32.

The opening 63 positioned along the outlet conduit 32, combined with the smile and frown shaped notches positioned along the inlet conduit 30, further reduces thermal stratification to promote a uniform water temperature within the water tank 11. The diameter "B" of the opening 63 may be increased or decreased to alter the volume, velocity and/or pressure of the water flow through opening 63. It is additionally envisioned that the opening 63 may be a frown-shaped notch, a rectangular opening or any other shape or form capable of drawing water into the outlet conduit 32. The position of the opening 63 along the top end portion 12a of the outlet tube may be adjusted in order to draw water from alternate depths of the top end portion 59 of the water tank 11. It is also envisioned that the outlet conduit 32 may include a plurality of openings 63 spaced radially and/or longitudinally along the outlet conduit 32.

The inner diameter "D" of the outlet conduit tube 72 may be increased or decreased to tailor the velocity and pressure of the flow of water through the outlet conduit tube 72. The outlet conduit tube 72 is shown in tubular form, however other embodiments such as a square tube, rectangular tube, or any other shape configured to transport liquid are envisioned.

The outlet conduit tube 72 may be composed of polypropylene, stainless steel, copper, or any other suitable plastic or metallic material. The outlet conduit tube 72 may be formed using any suitable manufacturing process such as injection molding, casting, machining, stamping, or extrusion, or any combination thereof.

An exemplary embodiment of an outlet conduit cap 71 is illustrated in FIGS. 10 and 11. The cap 71 is optionally applied to the inlet end 36 of the outlet conduit 32 to restrict the flow of water from the bottom end portion 60 of the water tank 11 through the inlet end 36 of the outlet conduit 32. The cap 71 is provided with an opening 73 of diameter "E". The diameter "E" and position of the opening 73 may be altered to tailor the flow of water drawn from the bottom end portion 60 of the water tank 11.

A surface of the cap 71 is welded to the inlet end 36 of the outlet conduit 32 according to one embodiment of the invention. However, the cap 71 may be attached to the inlet end 36 via fasteners, high-temperature waterproof adhesive or any other suitable means of securing the components. The cap 71 may be a separate fitting as shown, or alternatively could be integrated with the outlet conduit tube 72. The cap 71 can be composed of either a metallic or plastic material.

In one exemplary embodiment, water is drawn through both opening 73 of the cap 71 and opening 63 of the outlet conduit 32. The size and position of opening 73 relative to the size and position of opening 63 affects the degree of thermal stratification within the water tank 11. The relative sizes of opening 73 and opening 63 may be tailored to influence the volume of water drawn from the top end portion 59 of the water tank 11 with respect to the volume of water drawn from the bottom end portion 60 of the water tank 11. For example, if diameter "E" of opening 73 is significantly smaller than diameter "B" of opening 63, a greater volume of water will be drawn from the top end portion 59 of the water tank 11. Conversely, if the diameter "E" of opening 73 is significantly larger than the diameter "B" of opening 63, a greater amount of water will be drawn from the bottom end portion 60 of the water tank 11.

Similarly, the length of the outlet conduit (and the resultant position of openings 63 and 73 with respect to one another) will affect the impact of the outlet conduit on thermal stratification within the water heater. For example, by lengthening the outlet conduit (and thereby increasing the distance between the openings 63 and 73), the temperature differential between the water drawn through the respective openings 63 and 73 will tend to increase. Conversely, by shortening the outlet conduit (and thereby decreasing the distance between the openings 63 and 73), the temperature differential between the water drawn through the respective openings 63 and 73 will tend to decrease.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A method for delivering water into a water heater comprising the steps of:
    diverting a portion of water flow from a passage of an inlet conduit and into a top interior segment of the water heater;
    drawing water from the top interior segment of the water heater into the passage of the inlet conduit; and
    delivering water flow from the passage of the inlet conduit into a bottom interior segment of the water heater through an outlet opening of the inlet conduit.

2. The method of claim 1, further comprising the step of diverting a portion of the water flow from the passage of the inlet conduit and into a bottom interior segment of the water heater through an outlet opening spaced from the bottom end of the inlet conduit.

3. The method of claim 1, further comprising the step of drawing water from the bottom interior segment of the water heater into the passage of the inlet conduit.

4. An inlet configured for use in a water storage tank of a water heater, said inlet comprising:
    an inlet conduit having a top end portion configured to be coupled to an inlet port of the water storage tank, a bottom end portion configured to extend into an interior of the water storage tank, a passage for water flowing from said top end portion to said bottom end portion, and an outlet opening at a bottom end of said inlet conduit;
    means located at said top end portion of said inlet conduit for diverting a portion of the water flow from said passage of said inlet conduit into the water storage tank;
    means located at said top end portion of said inlet conduit for drawing water into said passage of said inlet conduit from the water storage tank; and
    means located at said bottom end portion of said inlet conduit and spaced from said outlet opening for diverting a portion of the water flow from said passage of said inlet conduit into the water storage tank.

5. The inlet of claim 4, said water drawing means comprising an inlet opening defined by said inlet conduit.

6. The inlet of claim 4, said water flow diverting means comprising an outlet opening defined by said inlet conduit.

7. The inlet of claim 6, said water flow diverting means further comprising a notch formed in said conduit and extending into said passage.

* * * * *